Aug. 6, 1935.   G. HAGLUND   2,010,077
PRODUCTION OF SOLUTIONS OF ALKALI METAL SALTS OF SULPHUROUS ACID
Filed Jan. 12, 1933
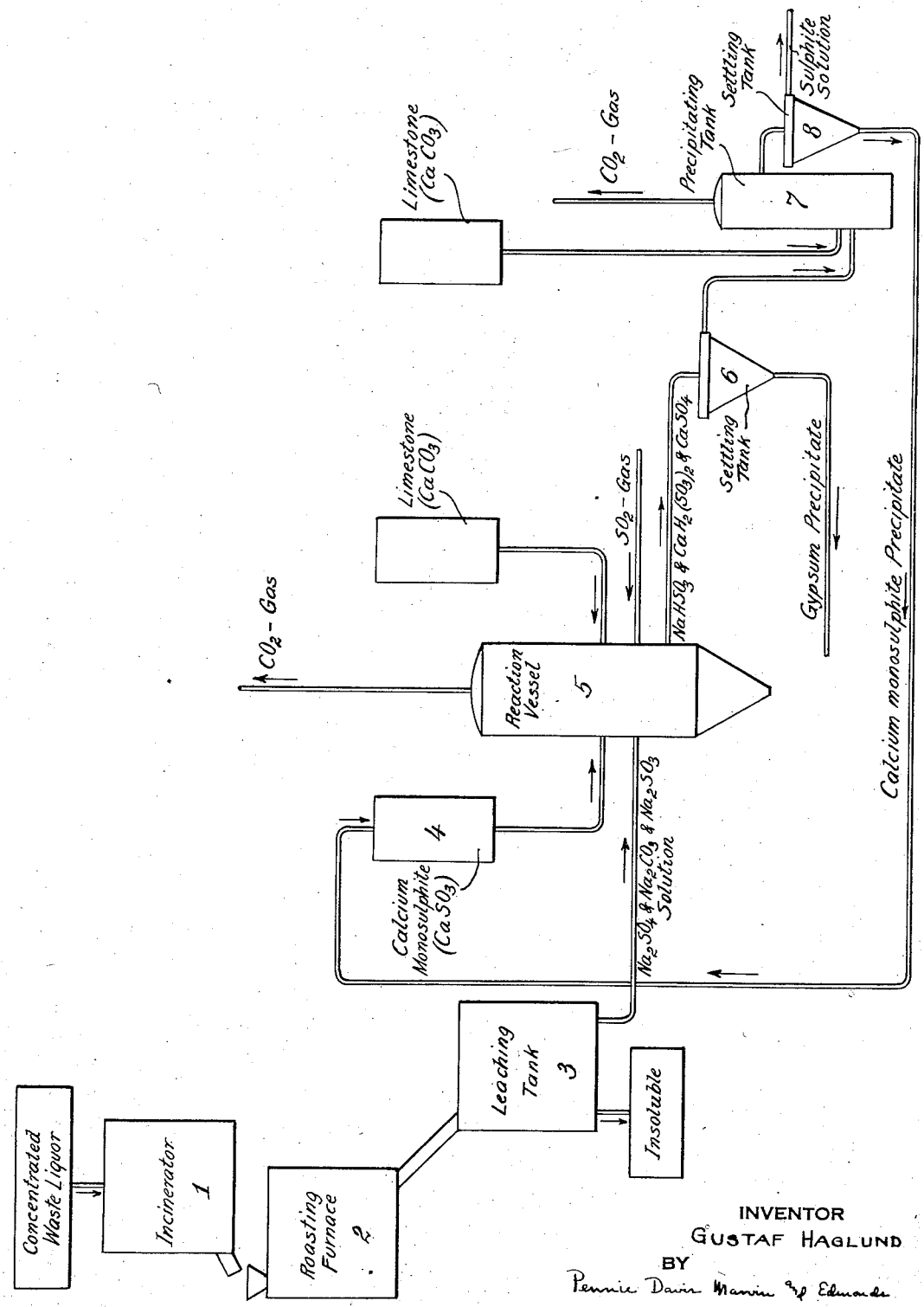
INVENTOR
GUSTAF HAGLUND
BY
Pennie Davis Marvin & Edmonds
ATTORNEYS Patented Aug. 6, 1935

2,010,077

UNITED STATES PATENT OFFICE 2,010,077

PRODUCTION OF SOLUTIONS OF ALKALI METAL SALTS OF SULPHUROUS ACID

Gustaf Haglund, Stockholm, Sweden, assignor to Patentaktiebolaget Gröndal - Ramen, Stockholm, Sweden Application January 12, 1933, Serial No. 651,245
In Germany April 29, 1932

10 Claims. (Cl. 23—129)

This invention relates to the production of solutions of alkali metal salts of sulphurous acid and has for an object the provision of an improved process for producing such solutions. More particularly, the invention contemplates the provision of an improved process for producing solutions containing alkali metal sulphites and/or alkali metal bisulphites substantially free from calcium salts. The invention further contemplates the production of solutions of the aforementioned type from waste liquors resulting from cellulose digestion processes.

In preparing solutions in accordance with the process of the invention, waste liquors such, for example, as waste liquors from alkali metal sulphite cellulose, alkali metal bisulphite cellulose or alkali metal sulphate cellulose production may be first concentrated to a convenient degree and then submitted to an ignition treatment with the admission of air in a known manner whereby the organic matters of the liquors are burnt. The residue may then be freed of its content of sulphides and thiosulphates in a known manner, for example through roasting whereby the compounds in question are converted to the corresponding sulphites or sulphates whereupon the roasted material is dissolved in water, or by placing the residue in solution in water and precipitating the sulphides and/or thiosulphates or converting them to harmless compounds such as sulphites or sulphates.

Solutions thus produced, free from sulphides and thiosulphates, contain chiefly alkali metal carbonates, alkali metal sulphites and alkali metal sulphates.

According to the process of the invention, the alkali metal salts are converted to alkali metal bisulphites by first treating the solution with sulphur dioxide gas and one or more calcium compounds capable of reacting with sulphurous acid to form calcium bisulphite, for instance, calcium carbonate, burnt lime (quick lime) or hydrate of lime in a very finely divided state.

The resulting reactions, in case the alkali metal salts are sodium salts and the added calcium salt is carbonate of calcium are indicated by the following equations:

(1)  $Na_2CO_3 + H_2O + 2SO_2 = 2NaHSO_3 + CO_2$
(2)  $CaCO_3 + H_2O + 2SO_2 = CaH_2(SO_3)_2 + CO_2$
(3)  $CaH_2(SO_3)_2 + Na_2SO_4 = 2NaHSO_3 + CaSO_4$

The sulphurous acid reacts directly with the alkali metal carbonate and the added calcium compound to form alkali metal bisulphite and calcium bisulphite. The calcium bisulphite in turn reacts with the alkali metal sulphate forming alkali metal bisulphite and gypsum, the latter being mainly obtained as a precipitate.

After this treatment, the solution will contain alkali metal bisulphites, calcium bisulphite, a varying quantity of free $SO_2$, a quantity of dissolved gypsum which stands in relation to the degree of solubility of gypsum in the solution, and further, in suspension or as a precipitate, the remaining gypsum formed, and such other insoluble matters as may be present in the solution.

In the next step of the process, to this solution from which the suspended or precipitated matters may have first been removed, for instance by filtering, further quantities of one or more finely divided calcium compounds, such as lime stone, other calcium carbonates, calcium oxide or calcium hydroxide are added without any further introduction of sulphur dioxide, and preferably with powerful vigorous stirring.

The entire free $SO_2$ content of the solution now combines with the added calcium compounds to form calcium bisulphite, and the solution will consequently only contain bisulphites, but no free $SO_2$. The content of dissolved calcium bisulphite will thus be increased, if the solution was not already saturated with calcium bisulphite.

The addition of the finely divided calcium compound is continued, and, as no free $SO_2$ is present in the solution, the calcium compound reacts with the sulphur dioxide of the bisulphite salts present in the solution, whereby monosulphites are formed. The formation of monosulphites begins with the calcium bisulphite and then proceeds to the alkali metal bisulphites and is equivalent to the added quantities of calcium compound, so that, through adjusting the addition of the calcium compound, solutions can be obtained containing all the alkali in the form of alkali metal bisulphite, alkali metal monosulphite or alkali metal bisulphite and alkali metal monosulphite in a desired relation.

As the calcium monosulphite is nearly insoluble, it precipitates from the solution immediately after having been formed. In the same degree as the conversion to monosulphite takes place, the solution is freed from the calcium salts dissolved therein. This applies not only to the calcium bisulphite, but also to the gypsum present in the solution. Thus, if all the calcium bisulphite is converted to calcium monosulphite and precipitated from the solution, and the solution consequently only contains alkali metal bisulphite and gypsum, the alkali metal bisulphite will be converted by the calcium compound that may still be added to alkali metal monosulphite, whereby ions of monosulphite appear in the solution. As soon as this takes place and due to the fact that calcium monosulphite is much less soluble than gypsum, the ions react with the gypsum forming calcium monosulphite, whereby at the same time alkali metal sulphate is formed.

After the treatment is finished, the solution will contain a quantity of alkali metal sulphate equivalent to the precipitated quantity of gypsum.

By means of the above-related treatment with calcium compounds the solution can be obtained wholly or practically free from calcium salts.

If, after the whole quantity of gypsum has been removed, still more alkali metal bisulphite is to be converted to alkali metal monosulphite, the addition of the calcium compound is continued until the desired degree of conversion has been obtained. The addition of the calcium compound may be continued until all the bisulphite has been converted into monosulphite.

The solution, which may contain alkali metal bisulphites, alkali metal monosulphites or a mixture of both, and which also may contain small quantities of gypsum or alkali metal sulphate is then, in a suitable manner, for instance by filtering, separated from the precipitate obtained, consisting of insoluble lime compounds. This precipitate may, to a small degree, consist of gypsum or calcium compounds which have not taken part in the reactions, but chiefly consists of calcium monosulphite. Through the above related treatment, a certain quantity of $SO_2$ combined to the calcium monosulphite is removed from the solution. In order that this $SO_2$ should not be wasted, but returned to the process, the precipitate taken off with its contents of $SO_2$ can be employed in the preparation of a new quantity of solution, i. e. can serve as a substitute for a part of the calcium compounds required for this purpose.

The calcium monosulphite of the precipitate combined with the $SO_2$ to form calcium bisulphite in a more rapid way than is, for instance, the case with calcium carbonate, and then reacts with the alkali metal sulphates in the above described manner. In this way, consequently, the $SO_2$ combined with the calcium monosulphite is returned to the process without any losses.

The accompanying flowsheet diagrammatically illustrates a preferred method of practicing the invention.

Waste liquor such as results from cellulose digestion processes is suitably concentrated, as by evaporation, to remove the bulk of the water, and is introduced into an incinerator 1, where it is heated to remove the balance of the water and to effect combustion of the organic matter. The product from the incinerator is fed into a roasting furnace 2, where it is roasted under conditions such that sulphides and thiosulphates contained therein are converted to sulphites and sulphates. The roasted product, containing substantially no free sulphides or thiosulphates, is transferred to a leaching tank 3, where the alkali metal salts are dissolved in water and the insoluble matter is separated out.

The aqueous solution thus obtained is introduced into a reaction vessel 5. Limestone and/or calcium monosulphite in a finely divided condition is added, and sulphur dioxide is passed into the solution. The limestone and/or calcium monosulphite reacts with alkali metal sulphates and sulphites in the presence of sulphur dioxide to form a solution of alkali metal bisulphites and a precipitate of calcium sulphate. Carbon dioxide that is evolved during the course of the reaction is allowed to escape.

When substantially all of the alkali metal salts have been converted to bisulphite, the solution is conducted to a settling tank 6 where the precipitated calcium sulphate settles out and is removed. The clarified solution then passes to a precipitating tank 7 and limestone in a finely divided state is added. The limestone serves to precipitate as calcium monosulphite the calcium compounds remaining in solution and to free the solution from sulphur dioxide, the alkali metal bisulphite being at the same time converted to alkali metal sulphites. The proportion of bisulphites converted to sulphites may be controlled by regulating the quantity of limestone added. Carbon dioxide is evolved during the course of the reaction and escapes through a suitable vent.

Solution from the precipitating tank 7, containing calcium monosulphite in suspension, passes to a settling tank 8, where the calcium monosulphite settles and is separated from the residual solution. The separated calcium monosulphite may be stored in tank 4, from which it may conveniently be added to solution contained in the reaction vessel 5. Clarified alkali metal sulphite solution from the settling tank 8 is conveyed to suitable storage tanks (not shown) from which it may be distributed to various points of use.

I claim:

1. The process for preparing a solution of alkali metal salts of sulphurous acid from waste liquor resulting from a cellulose digestion process employing cooking liquor containing alkali metal sulphur compounds, which comprises treating the waste liquor to eliminate organic compounds and to form a solution of alkali metal compounds containing an alkali metal sulphate and substantially free from sulphides and thiosulphates, subjecting the solution to the action of sulphur dioxide and one or more calcium compounds capable of reacting with sulphurous acid to form calcium bisulphite until the alkali metal salts contained in the solution have been converted to bisulphites, and subjecting the bisulphite solution to the action of one or more calcium compounds capable of reacting with bisulphite to form calcium monosulphite until calcium salts in the solution are converted to the monosulphite form, the treatment of the bisulphite solution with the calcium compounds being regulated to produce a solution substantially free of calcium salts.

2. Process according to claim 1 in which treatment of the bisulphite solution with one or more calcium compounds is so regulated that conversion of any substantial amount of alkali metal bisulphite to the monosulphite form is avoided.

3. Process according to claim 1 in which treatment of the bisulphite solution with one or more calcium compounds is so regulated that a portion of alkali metal bisulphite is converted to the monosulphite form.

4. Process according to claim 1 in which treatment of the bisulphite solution with one or more calcium compounds is so regulated that the alkali metal bisulphite is substantially all converted to the monosulphite form.

5. Process according to claim 1 in which the calcium monosulphite produced is utilized in conjunction with the sulphur dioxide for producing the bisulphite solution.

6. The process for preparing a solution of alkali metal salts of sulphurous acid from waste liquor resulting from a cellulose digestion process employing cooking liquor containing alkali metal sulphur compounds, which comprises treating the waste liquor to eliminate organic compounds and to form a solution of alkali metal compounds containing an alkali metal sulphate and substantially free from sulphides and thiosulphates, subjecting the solution to the action of sulphur dioxide and calcium carbonate until the alkali metal salts contained in the solution have been converted to bisulphites, and subjecting the bisulphite solution to the action of calcium carbonate until calcium salts in the solution are converted to the monosulphite form.

7. Process according to claim 6 in which treatment of the bisulphite solution with calcium carbonate is so regulated that conversion of any substantial amount of alkali metal bisulphite to the monosulphite form is avoided.

8. Process according to claim 6 in which treatment of the bisulphite solution with calcium carbonate is so regulated that a portion of alkali metal bisulphite is converted to the monosulphite form.

9. Process according to claim 6 in which treatment of the bisulphite solution with calcium carbonate is so regulated that the alkali metal bisulphite is substantially all converted to the monosulphite form.

10. The process for preparing a solution containing one or more alkali metal salts of sulphurous acid which comprises subjecting a solution containing an alkali metal sulphate to the action of sulphur dioxide and one or more calcium compounds capable of reacting with sulphurous acid to form calcium bisulphite until the alkali metal salts contained in the solution have been converted to bisulphites, and subjecting the bisulphite solution to the action of one or more calcium compounds capable of reacting with bisulphite to form calcium monosulphite until calcium salts in the solution are converted to the monosulphite form, the treatment of the bisulphite solution with the calcium compounds being regulated to produce a solution substantially free of calcium salts.

GUSTAF HAGLUND.